United States Patent
Mazyar et al.

(10) Patent No.: US 10,060,237 B2
(45) Date of Patent: Aug. 28, 2018

(54) METHODS OF EXTRACTING HYDROCARBONS FROM A SUBTERRANEAN FORMATION, AND METHODS OF TREATING A HYDROCARBON MATERIAL WITHIN A SUBTERRANEAN FORMATION

(71) Applicant: Baker Hughes Incorporated, Houston, TX (US)

(72) Inventors: Oleg A. Mazyar, Houston, TX (US); Oleksandr V. Kuznetsov, Houston, TX (US); Gaurav Agrawal, Aurora, CO (US); Michael H. Johnson, Spring, TX (US); Valery N. Khabashesku, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 58 days.

(21) Appl. No.: 14/088,339

(22) Filed: Nov. 22, 2013

(65) Prior Publication Data

US 2015/0144344 A1 May 28, 2015

(51) Int. Cl.
*E21B 36/04* (2006.01)
*E21B 43/24* (2006.01)
(Continued)

(52) U.S. Cl.
CPC .............. *E21B 43/24* (2013.01); *C09K 8/524* (2013.01); *C09K 8/536* (2013.01); *C09K 8/592* (2013.01); *C09K 8/92* (2013.01); *C09K 2208/10* (2013.01)

(58) Field of Classification Search
CPC ............ C09K 8/892; C09K 8/58; E21B 43/22
See application file for complete search history.

(56) References Cited

U.S. PATENT DOCUMENTS

| 4,330,037 A | 5/1982 | Richardson et al. |
| 4,466,885 A | 8/1984 | Ronden |

(Continued)

FOREIGN PATENT DOCUMENTS

| CA | 1214989 A1 * | 12/1986 | ............ E21B 43/24 |
| CN | 1927895 A | 3/2007 | |

(Continued)

OTHER PUBLICATIONS

Kelland. Production Chemicals for the Oil and Gas Industry (Chapter 11).*

(Continued)

*Primary Examiner* — William D Hutton, Jr.
*Assistant Examiner* — Avi T Skaist
(74) *Attorney, Agent, or Firm* — TraksBritt (57) ABSTRACT

A method of extracting hydrocarbons from a subterranean formation comprises forming a suspension comprising reactive particles and a carrier fluid. The suspension is introduced into a subterranean formation containing a hydrocarbon material. At least a portion of the reactive particles are exothermically reacted with at least one other material within the subterranean formation to form a treated hydrocarbon material from the hydrocarbon material. The treated hydrocarbon material is extracted from the subterranean formation. An additional method of extracting hydrocarbons from a subterranean formation, and a method of treating a hydrocarbon material within a subterranean formation are also described.

19 Claims, 1 Drawing Sheet

(51) Int. Cl.
*C09K 8/524* (2006.01)
*C09K 8/536* (2006.01)
*C09K 8/592* (2006.01)
*C09K 8/92* (2006.01)

(56) References Cited

U.S. PATENT DOCUMENTS

| | | | |
|---|---|---|---|
| 4,615,391 A * | 10/1986 | Garthoffner | E21B 43/243 |
| | | | 166/257 |
| 5,674,620 A | 10/1997 | Puiia et al. | |
| 5,855,243 A * | 1/1999 | Bragg | C09K 8/26 |
| | | | 166/275 |
| 6,287,360 B1 | 9/2001 | Kembaiyan et al. | |
| 8,191,658 B2 | 6/2012 | Schmitz et al. | |
| 8,278,251 B2 | 10/2012 | Huang | |
| 8,528,633 B2 | 9/2013 | Agrawal et al. | |
| 2006/0167147 A1 | 7/2006 | Asgari | |
| 2006/0169450 A1 | 8/2006 | Mang et al. | |
| 2007/0181224 A1 | 8/2007 | Marya et al. | |
| 2007/0202318 A1 * | 8/2007 | Smith | B01J 13/02 |
| | | | 428/323 |
| 2008/0069961 A1 | 3/2008 | Sarkar et al. | |
| 2009/0137432 A1 | 5/2009 | Sullivan et al. | |
| 2009/0211758 A1 | 8/2009 | Bragg et al. | |
| 2010/0083583 A1 | 4/2010 | Sumiya et al. | |
| 2010/0243248 A1 * | 9/2010 | Golomb et al. | 166/270 |
| 2010/0300764 A1 | 12/2010 | Naidoo et al. | |
| 2010/0326662 A1 | 12/2010 | Kaminsky et al. | |
| 2011/0114323 A1 | 5/2011 | Jennings et al. | |
| 2011/0132621 A1 | 6/2011 | Agrawal et al. | |
| 2011/0278002 A1 | 11/2011 | McGuire et al. | |
| 2013/0043028 A1 | 2/2013 | Chakraborty et al. | |
| 2013/0140240 A1 | 6/2013 | Mazyar | |
| 2013/0206400 A1 * | 8/2013 | Alexandrov | E21B 43/24 |
| | | | 166/250.01 |
| 2013/0206425 A1 | 8/2013 | Mazyar et al. | |
| 2013/0220616 A1 | 8/2013 | Seth et al. | |
| 2013/0300066 A1 | 11/2013 | Xu et al. | |
| 2014/0224483 A1 * | 8/2014 | Hart | C09K 8/592 |
| | | | 166/261 |

FOREIGN PATENT DOCUMENTS

| | | |
|---|---|---|
| CN | 102504795 A | 6/2012 |
| CN | 103080471 A | 5/2013 |
| EP | 1116858 A1 | 7/2001 |

OTHER PUBLICATIONS

Pardo et al., Corrosion Behaviour of Magnesium/Aluminium Alloys in 3.5 wt.% NaCl, Corrosion Science, vol. 50, pp. 823-834. (2008).
Song et al., Understanding Magnesium Corrosion, Advanced Engineering Materials, vol. 5, No. 12, (2003), pp. 837-858.
International Preliminary Report on Patentability for International Application No. PCT/US2014/028297 dated Sep. 15, 2015, 6 pages.
International Search Report for International Application No. PCT/US2014/028297 dated Jul. 10, 2014, 3 pages.
International Written Opinion for International Application No. PCT/US2014/028297 dated Jul. 10, 2014, 5 pages.
International Search Report for International Application No. PCT/US2014/061561 dated Jan. 29, 2015, 3 pages.
International Written Opinion for International Application No. PCT/US2014/061561 dated Jan. 29, 2015, 10 pages.
Canadian Office Action for Canadian Application No. 2,932,583, dated Mar. 30, 2017, 4 pages.

* cited by examiner though the subject matter of this application is related to the subject matter of U.S. patent application Ser. No. 14/088, 331, filed Nov. 22, 2013, now U.S. Pat. No. 9,879,511, issued Jan. 30, 2018, and entitled "METHODS OF OBTAINING A HYDROCARBON MATERIAL CONTAINED WITHIN A SUBTERRANEAN FORMATION, AND RELATED STABILIZED EMULSIONS," the disclosure of which is hereby incorporated herein in its entirety by this reference.

TECHNICAL FIELD

Embodiments of the disclosure relate generally to methods of extracting a hydrocarbon material from a subterranean formation, and to methods of treating a hydrocarbon material within a subterranean formation. More particularly, embodiments of the disclosure relate to methods of extracting a hydrocarbon material from a subterranean formation using a suspension including reactive particles, and to related methods of treating a hydrocarbon material within a subterranean formation.

BACKGROUND

In the subterranean drilling and completion industry there are times when a hydrocarbon material located within a subterranean formation is difficult and costly to extract for further processing. For example, hydrocarbon materials including high molecular weight hydrocarbons, such as asphaltenes (e.g., bitumen) and various paraffins, have conventionally required expensive and inefficient extraction processes, such as steam injection processes, to suspensionize, detach, and extract the hydrocarbon materials. In addition, the presence of such high molecular weight hydrocarbons in the extracted hydrocarbon material may necessitate additional processing and costs, as such hydrocarbons can have limited commercial utility and can require expensive and complex refining processes (e.g., cracking processes) to be converted into commercially viable products.

It would, therefore, be desirable to have improved methods of extracting a hydrocarbon material, such as a hydrocarbon material including high molecular weight hydrocarbons, from a subterranean formation to overcome one or more of the above problems.

BRIEF SUMMARY

Embodiments described herein include methods of extracting hydrocarbons from a subterranean formation, and methods of treating a hydrocarbon material within a subterranean formation. For example, in accordance with one embodiment described herein, a method of extracting hydrocarbons from a subterranean formation comprises forming a suspension comprising reactive particles and a carrier fluid. The suspension is introduced into a subterranean formation containing a hydrocarbon material. At least a portion of the reactive particles are exothermically reacted with at least one other material within the subterranean formation to form a treated hydrocarbon material from the hydrocarbon material. The treated hydrocarbon material is extracted from the subterranean formation.

In additional embodiments, a method of extracting hydrocarbons from a subterranean formation comprises forming nanoparticles comprising at least one of Mg, Al, Ca, Mn, and Zn. The nanoparticles are combined with a carrier fluid to form a suspension. The suspension is injected into a subterranean formation having a hydrocarbon material attached to internal surfaces thereof. At least one of a temperature, pH, material composition, and pressure within the subterranean formation is modified to react at least a portion of the nanoparticles with an aqueous material and form a stabilized emulsion comprising a treated hydrocarbon material. The stabilized emulsion is extracted from the subterranean formation.

In yet additional embodiments, a method of treating a hydrocarbon material within a subterranean formation comprises providing reactive particles into interstitial spaces of a subterranean formation containing the hydrocarbon material. At least a portion of the reactive particles are reacted within the subterranean formation to produce heat and modify at least one property of the hydrocarbon material.

DETAILED DESCRIPTION

Methods of extracting hydrocarbons from a subterranean formation are described, as are methods of extracting hydrocarbons from a subterranean formation are described, as are methods of treating a hydrocarbon material within a subterranean formation. In some embodiments, a method of extracting hydrocarbons from a subterranean formation includes forming a suspension comprising reactive particles and a carrier suspension. The reactive particles may be structured and formulated to react in a selectively controlled manner with one or more materials delivered to and/or already present within the subterranean formation. The suspension may be delivered into the subterranean formation, and at least one environmental condition within the subterranean formation may be used and/or modified to facilitate one or more reactions with the reactive particles. The reactions may degrade the reactive particles, and produce heat and one or more reaction products. Delivering and reacting the reactive particles within the subterranean formation may detach a hydrocarbon material from internal surfaces of the subterranean formation, and may chemically and/or physically modify the hydrocarbon material to assist with the extraction of desired hydrocarbons from the subterranean formation. Byproducts formed from reacting the reactive particles within the subterranean formation may also assist with the extraction of the hydrocarbons. The hydrocarbons may be extracted from a subterranean formation as part of a stabilized emulsion, may be separated from other materials of the stabilized emulsion, and may be utilized as desired. The methods of the disclosure may increase the efficiency and reduce the costs of extracting various hydrocarbons from subterranean formations as compared to conventional extraction methods, and may also increase the quality, versatility, and value of the extracted hydrocarbons relative to those obtained through conventional extraction methods.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering hydrocarbons from a hydrocarbon-bearing subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawing and does not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, the term "about" in reference to a given parameter is inclusive of the stated value and has the meaning dictated by the context (e.g., it includes the degree of error associated with measurement of the given parameter).

Figure 1:
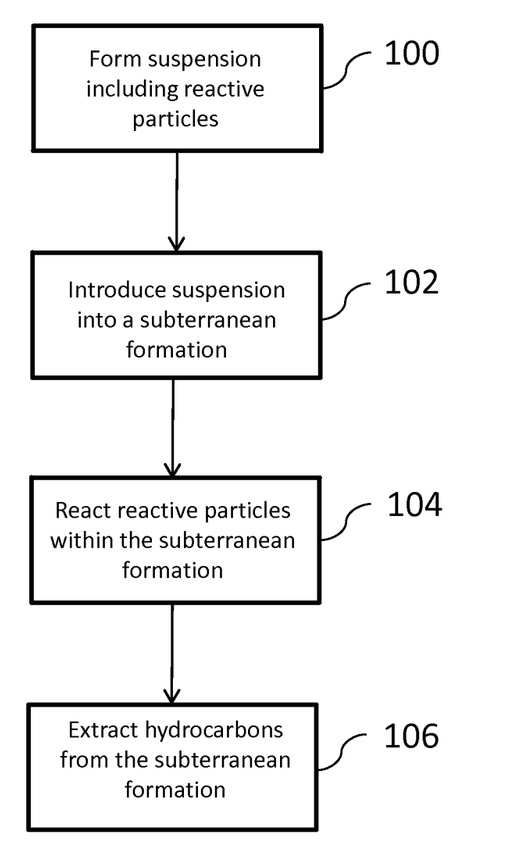
FIG. 1 is a simplified flow diagram depicting a method of exacting hydrocarbons from a subterranean formation, in accordance with embodiments of the disclosure.

FIG. 1 is a simplified flow diagram illustrating a method of extracting hydrocarbons from a subterranean formation, in accordance with embodiments of the disclosure. The method may include a suspension formation process 100 including forming a suspension including a plurality of reactive particles, an injection process 102 including delivering the suspension into a subterranean formation, a reaction process 104 including reacting at least a portion of the reactive particles in the presence of a hydrocarbon material contained within the subterranean formation to form a treated hydrocarbon material, and an extraction process 106 including removing the treated hydrocarbon material from the subterranean formation. With the description as provided below, it will be readily apparent to one of ordinary skill in the art that the method described herein may be used in various applications. In other words, the method may be used whenever it is desired to at least partially treat a hydrocarbon material contained within a subterranean formation.

Referring to FIG. 1, the suspension formation process 100 includes forming a suspension including reactive particles and at least one carrier fluid. The reactive particles may be formed of and include at least one material that undergoes an exothermic reaction in the presence of an aqueous material, such as an aqueous material that may be found in the downhole environment of a subterranean formation. The reactive particles may be chemically degradable (e.g., corrodible) in the presence of the various aqueous materials (e.g., water, brines, etc.) that may be delivered to and/or already present within a subterranean formation. The reactive particles of the suspension may be compatible with the other components (e.g., materials, constituents, etc.) of the suspension. As used herein, the term "compatible" means that a material does not react, decompose, or absorb another material in an unintended way, and also that the material does not impair the chemical and/or mechanical properties of the another material in an unintended way. For example, each of the reactive particles may be structured (e.g., sized, shaped, layered, etc.) and formulated such that the reactive particles do not substantially react with the carrier fluid of the suspension under the conditions (e.g., temperature, pressure, pH, flow rate, etc.) in which the suspension is delivered into a subterranean formation.

The reactive particles are structured and formulated to exhibit selectable and controllable chemical degradation (e.g., corrosion) properties. The reactive particles may be formed of and include a material that chemically degrades in response to a change in at least one environmental condition (e.g., temperature, pH, material exposure, etc.) to which the reactive particles are exposed, and/or may be formed of and include a material that chemically degrades without a change in the environmental conditions to which the reactive particles are exposed. By way of non-limiting example, at least a portion of each of the reactive particles may be formed of and include at least one material that switches from a first chemical degradation rate to a second, faster chemical degradation rate in response to a change in at least one environmental condition (e.g., temperature, pH, material exposure, etc.). For example, at least a portion of the reactive particles may exhibit a relatively slow chemical degradation rate, including a zero chemical degradation rate, when exposed to a first material (e.g., an organic material), but may exhibit a faster chemical degradation rate when exposed to a second material (e.g., an aqueous material). As another example, the reactive particles may exhibit a relatively slow chemical degradation rate in an aqueous material at a first temperature and/or a first pH, but may exhibit a faster chemical degradation rate in the aqueous material at a second, higher temperature and/or a second, lower pH. The selectable and controllable chemical degradation properties of the reactive particles may enable the chemical and/or mechanical properties of reactive particles to be maintained until the reactive particles fulfill at least one desired function, at which time at least one ambient environmental condition may be changed to promote the at least partial removal (e.g., by way of corrosion) of the reactive particles.

In addition, the reactive particles are structured and formulated to remove a hydrocarbon material from at least one surface of a subterranean formation. For example, at least a portion of the reactive particles may be structured and formulated to be at least partially abrasive. As used herein, the term "abrasive" means that a structure (e.g., particle) is able to mar, scratch, scrape, gouge, abrade, and/or shear a material from a surface. The reactive particles may be structured and formulated to abrasively remove the hydrocarbon material from the surface of the subterranean formation upon contacting an interface of the hydrocarbon material and the subterranean formation. As another example, at least a portion of the reactive particles may be structured and formulated to at least partially react with another material delivered to and/or already present with the subterranean formation to remove the hydrocarbon material from the surface of the subterranean formation. Reactions between the reactive particles and at least one other material (e.g., an aqueous material) may, for example, facilitate the direct and/or indirect chemical degradation (e.g., corrosion) of the surface of the subterranean formation and free (e.g., release, extricate, dislodge, etc.) the hydrocarbon material attached to the surface of the subterranean formation.

Furthermore, the reactive particles are formulated such that chemical degradation (e.g., through one or more corrosion reactions) of the reactive particles within the subterranean formation promotes the extraction of desired hydrocarbons from the subterranean formation. For example, chemical reactions between the reactive particles and at least one other material (e.g., an aqueous material) within the subterranean formation may generate heat and reaction byproducts that facilitate a change in one or more properties (e.g., physical and/or chemical properties, such as material composition, density, viscosity, temperature, pressure, pH, etc.) of a hydrocarbon material contained within the subterranean formation.

As a non-limiting example, at least a portion of the reactive particles may be formed of and include a metal material that is controllably degradable (e.g., corrodible) in the presence of an aqueous material, such as an aqueous material typically found in a downhole environment (e.g., an aqueous material comprising water and at least one of an alcohol, ammonium chloride, calcium chloride, calcium bromide, hydrochloric acid, hydrogen sulfide, magnesium chloride, magnesium boride, potassium chloride, potassium formate, sodium chloride, sodium boride, sodium formate, zinc bromide, zinc formate, and zinc oxide, a different salt, and different corrosive material). The metal material may be exothermically reactive with water. The metal material may be formed of and include an active metal having a standard oxidation potential greater than or equal to that of zinc (Zn). The active metal may be relatively anodic in the presence of the aqueous material. For example, the active metal may comprise magnesium (Mg), aluminum (Al), calcium (Ca), manganese (Mn), or Zn. In some embodiments, active metal is Mg. In addition, the metal material may, optionally, include at least one additional constituent. The additional constituent may influence one or more properties of the active metal. For example, the additional constituent may adjust (e.g., increase, or decrease) the chemical degradation (e.g., corrosion) rate of the active metal in the aqueous material. The additional constituent may be relatively cathodic in the presence of the aqueous material. By way of non-limiting example, depending on the active metal, the additional constituent may comprise at least one of aluminum (Al), bismuth (Bi), cadmium (Cd), calcium (Ca), cobalt (Co), copper (Cu), iron (Fe), gallium (Ga), indium (In), lithium (Li), nickel (Ni), silicon (Si), silver (Ag), strontium (Sr), thorium (Th), tin (Sn), titanium (Ti), tungsten (W), zinc (Zn), and zirconium (Zr). In some embodiments, the additional constituent comprises at least one of Al, Ni, W, Co, Cu, and Fe. The active metal may be doped, alloyed, or otherwise combined (e.g., covered) with the additional constituent. Non-limiting examples of metal materials that may be included in the reactive particles, along with methods of forming the metal materials, are disclosed in U.S. patent application Ser. No. 13/466,311, now U.S. Pat. No. 9,605,508, issued Mar. 28, 2017 and U.S. patent application Ser. No. 12/633,677, now U.S. Pat. No. 8,327,931, issued Dec. 11, 2012, the disclosure of each of which is hereby incorporated herein by reference in its entirety.

In some embodiments, at least a portion of the reactive particles are formed of and include an Mg alloy. Suitable Mg alloys include, but are not limited to, alloys of Mg and at least one of Al, Bi, Cd, Ca, Ce, Co, Cu, Fe, Ga, In, Li, Mn, Ni, Sc, Si, Ag, Sr, Th, Sn, Ti, W, Y, Zn, and Zr. For example, at least a portion of the reactive particles may be formed of and include an Mg—Zn alloy, an Mg—Al alloy, an Mg—Mn alloy, an Mg—Li alloy, an Mg—Ca alloy, an Mg—X alloy, and/or an Mg—Al—X alloy, where X includes at least one of Bi, Cd, Ca, Co, Cu, Fe, Ga, In, Li, Mn, Ni, Sc, Si, Ag, Sr, Th, Sn, Ti, W, Y, Zn, and Zr. The Mg alloy may, for example, include up to about 99% Mg, such as up to about 95% Mg, up to about 90% Mg, up to about 85% Mg, up to about 80% Mg, up to about 75% Mg, up to about 70% Mg, or up to about 65% Mg. As a non-limiting example, suitable Mg—Al—X alloys may, for example, include up to about 85% Mg, up to about 15% Al, and up to about 5% X. Non-limiting examples of commercially available Mg alloys that include different combinations of the above alloying elements to achieve different chemical degradation rates in an aqueous material include AJ62, AJ50x, AH51x, AJ52x, and AZ91A-E alloys. In addition, the Mg alloy may, optionally, be doped and/or otherwise combined with at least one of Al, Bi, Cd, Ca, Co, Cu, Fe, Ga, In, Li, Mn, Ni, Si, Ag, Sr, Th, Sn, Ti, W, Zn, and Zr. In additional embodiments, at least a portion of the reactive particles may be formed of and include pure Mg, or Mg doped and/or otherwise combined with at least one of Al, Bi, Cd, Ca, Ce, Co, Cu, Fe, Ga, In, Li, Mn, Ni, Sc, Si, Ag, Sr, Th, Sn, Ti, W, Y, Zn, and Zr.

In additional embodiments, at least a portion of the reactive particles are formed of and include an Al alloy. Suitable Al alloys include, but are not limited to, alloys of Al and at least one of Bi, Cd, Ca, Ce, Co, Cu, Fe, Ga, In, Li, Mn, Mg, Ni, Sc, Si, Ag, Sr, Th, Sn, W, Y, Zn, and Zr. For example, at least a portion of the reactive particles may be formed of and include an Al—Mg alloy, Al—Ca alloy, an Al—Ga alloy (e.g., 80Al-20Ga), an Al in alloy, an Al—Ga—Bi alloy (e.g., 80Al-10Ga-10Bi), an Al—Ga—In alloy (e.g., 80Al-10Ga-10In), an Al—Ga—Bi—Sn alloy (e.g., Al—Ga—Bi—Sn), an Al—Ga—Zn alloy (e.g., 80Al-10Ga-10Zn), an Al—Ga—Mg alloy (e.g., 80Al-10Ga-10Mg), an Al—Ga. Zn—Mg alloy (e.g., 80Al-10Ga-5Zn-5Mg), an Al—Ga—Zn—Cu alloy (e.g., 85Al-5Ga-5Zn-5Cu), an Al—Ga—Bi—Sn alloy (e.g., 85Al-5Ga-5Bi-5Cu), an Al—Zn—Bi—Sn alloy (e.g., 85Al-5Zn-5Bi-5Sn), an Al—Ga—Zn—Si alloy (e.g., 80Al-5Ga-5Zn-10Si), an Al—Ga—Zn—Bi—Sn alloy (e.g., 80Al-5Ga-5Zn-5Bi-5Sn, 90Al-2.5Ga-2.5Zn-2.5Bi-2.5Sn), an Al—Ga—Zn—Sn—Mg alloy (e.g., 75Al-5Ga-5Zn-5Sn-5Mg), an Al—Ga—Zn—Bi—Sn—Mg alloy (e.g., 65Al-10Ga-10Zn-5Sn-5Bi-5Mg), an Al—X alloy, and/or an Al—Ga—X alloy, where X includes at least one of Bi, Cd, Ca, Co, Cu, Fe, Ga, In, Li, Mn, Ni, Si, Ag, Sr, Th, Sn, Ti, W, Zn, and Zr. The Al alloy may, for example, include up to about 99% Al, such as up to about 95% Al, up to about 90% Al, up to about 85% Al, up to about 80% Al, up to about 75% Al, up to about 70% Al, or up to about 65% Al. In addition, the Al alloy may, optionally, be doped and/or otherwise combined with at least one of Bi, Cd, Ca, Ce, Co, Cu, Fe, Ga, In, Li, Mg, Mn, Ni, Sc, Si, Ag, Sr, Th, Sn, Ti, W, Y, Zn, and Zr. In additional embodiments, at least a portion of the reactive particles may be formed of and include pure Al, or Al doped and/or otherwise combined with at least one of Bi, Cd, Ca, Ce, Co, Cu, Fe, Ga, In, Li, Mg, Mn, Ni, Sc, Si, Ag, Sr, Th, Sn, Ti, W, Y, Zn, and Zr.

In further embodiments, at least a portion of the reactive particles are formed of and include a Ca alloy. Suitable Ca alloys include, but are not limited to, alloys of Ca and at least one of Al, lei, Cd, Ce, Co, Cu, Fe, Ga, Mn, Mg, Ni, Sc, Si, Ag, Sr, Th, Sn, Ti, W, Y, Zn, and Zr. For example, at least a portion of the reactive particles may be formed of and include an Ca—Li alloy, a Ca—Mg alloy, a Ca—Al alloy, a Ca—Zn alloy, a Ca—Li—Zn alloy, and/or an Ca—X alloy, where X includes at least one of Al, Bi, Cd, Co, Cu, Fe, Ga, In, Li, Mg, Mn, Ni, Si, Ag, Sr, Th, Sn, Ti, W, Zn, and Zr. The Ca alloy may, for example, include up to about 99% Ca, such as up to about 95% Ca, up to about 90% Ca, up to about 85% Ca, up to about 80% Ca, up to about 75% Ca, up to about 70% Ca, or up to about 65% Ca. In addition, the Ca alloy may, optionally, be doped and/or otherwise combined with at least one of Al, Bi, Cd, Ce, Co, Cu, Fe, Ga, In, Li, Mg, Mn, Ni, Sc, Si, Ag, Sr, Th, Sn, Ti, W, Zn, Y, and Zr. In additional embodiments, at least a portion of the reactive particles may be formed of and include pure Ca, or Ca doped and/or otherwise combined with at least one of Al, Bi, Cd, Ce, Co, Cu, Fe, Ga, In, Li, Mg, Mn, Ni, Sc, Si, Ag, Sr, Th, Sn, Ti, W, Zn, Y, and Zr.

As another non-limiting example, at least a portion of the reactive particles may be formed of and include an anhydrous metal salt. The anhydrous metal salt may be highly reactive with water, such as the water typically found in a downhole environment. For example, the anhydrous metal salt may comprise anhydrous aluminum bromide ($AlBr_3$), anhydrous magnesium chloride ($MgCl_2$), anhydrous ferric chloride ($FeCl_3$), or anhydrous aluminum chloride ($AlCl_3$). In some embodiments, at least a portion of the reactive particles are formed of and include anhydrous aluminum chloride ($AlCl_3$).

As a further non-limiting example, at least a portion of the reactive particles may be formed of and include another material that reacts with water to produce heat, including, but not limited to, at least one of an alkali metal, an alkaline earth metal, an acid anhydride (e.g., maleic anhydride), an acyl chloride, a carbide (e.g., calcium carbide), a halide (e.g., a chloride, a bromide, etc.), a hydride (e.g., sodium hydride, sodium borohydride), an organometallic material, an oxide (e.g., calcium oxide), an organic peroxide, an inorganic peroxide, and a phosphide (e.g., aluminum phosphide).

At least some of the reactive particles may comprise composite particles. As used herein, the term "composite particle" means and includes a particle including at least two constituent materials that remain distinct on a micrometric level while forming a single particle. For example, the composite particle may include a core of a first material at least partially encapsulated (e.g., covered, surrounded, etc.) by a shell of a second material. The core may, for example, be formed of and include a material that is relatively more reactive in an aqueous material, and the shell may be formed of and include a material that is relatively (e.g., as compared to the core) less reactive in the aqueous material. By way of non-limiting example, the core may be formed of and include a metal material (e.g., at least one of Mg, Al, Ca, Mn, Zn, an alloy thereof, a combination thereof, etc.), an anhydrous metal salt (e.g., $AlBr_3$, $MgCl_2$, $FeCl_3$, $AlCl_3$), or another material exothermically reactive with water, and the shell may be formed of and include a material relatively less reactive in an aqueous material, such as at least one of a less reactive polymer material, a less reactive crystalline material, a less reactive organic material, a less reactive inorganic material, a less reactive metallic material, a less reactive magnetic material, and a less reactive ceramic material.

In some embodiments, at least some of the reactive particles are formed of and include a core comprising an Mg alloy (e.g., an Mg—Al alloy) and a shell comprising an organic material. The organic material may at least partially surround the core, and may be formed of and include at least one organic compound. As a non-limiting example, the organic material may be a polymeric material formed of and including at least one polymer. The organic material may be attached to the core through at least one of chemical bonds with atoms of the core, ion-dipole interactions, π-cation and π-π interactions, and surface adsorption (e.g., chemisorptions, and/or physisorption). The organic material may, for example, comprise at least one of a hydroxyethylcellulose material that is soluble in an aqueous material (e.g., fresh water, seawater, produced water, brine, aqueous-based foams, water-alcohol mixtures, etc.), a polyalkylene glycol-based material that is soluble in another organic material (e.g., a hydrocarbon material, such as crude oil, diesel, mineral oil, an ester, a refinery cut or blend, an alpha-olefin, a synthetic-based fluid, etc.), and an organosilane material that is soluble in an aqueous material or another organic material. In additional embodiments, at least some of the reactive particles are formed of and include a core comprising an Mg alloy (e.g., an Mg Al alloy) and a shell comprising a relatively less reactive metallic material. The shell may, for example, be formed of and include Al, Bi, Cd, Ca, Co, Cu, Ce, Fe, Ga, In, Li, Mg, Mn, Ni, Sc, Si, Ag, Sr, Th, Sn, Ti, W, Y, Zn, Zr, alloys thereof, carbides thereof, nitrides thereof, oxides thereof, or combinations thereof. As a non-limiting example, the metal-containing material may be an abrasive material, such as alumina, silica, titania, ceria, zirconia, germania, magnesia, a silicon carbide, a metal nitride, or a combination thereof. In further embodiments, at least some of the reactive particles are formed of and include a core comprising an anhydrous metal salt and a shell comprising a less reactive metal-containing material (e.g., a less reactive metal material formed of and including Al, Bi, Cd, Ca, Co, Cu, Ce, Fe, Ga, In, Li, Mg, Mn, Ni, Sc, Si, Ag, Sr, Th, Sn, Ti, W, Y, Zn, Zr, carbides thereof, nitrides thereof, oxides thereof, or combinations thereof). For example, the at least some of the reactive particles may be formed of and include a core comprising an anhydrous $AlCl_3$ and a shell comprising an Al-containing material (e.g., alumina).

If present, the shell may be formed on or over the core using conventional processes, which are not described in detail herein. The shell may, for example, be formed on or over the core through at least one of a thermal decomposition process, a chemical vapor deposition (CVD) process, a physical vapor deposition (PVD) process (e.g., sputtering, evaporation, ionized PVD, etc.), an atomic layer deposition (ALD) process, and a physical mixing process (e.g., cryomilling, ball milling, etc.). In some embodiments, a shell comprising a less reactive metal-containing material (e.g., alumina) is formed on a core comprising a more reactive metal material (e.g., at least one of Mg, Al, Ca, Mn, Zn, an alloy thereof, a combination thereof, etc a more reactive anhydrous metal salt (e.g., $AlBr_3$, $MgCl_2$, $FeCl_3$, $AlCl_3$) through thermal decomposition of an organometallic compound. By way of non-limiting example, a shell formed of and including Al may be formed on a core formed of and including an Mg—Al alloy or anhydrous $AlC_{13}$ by thermally decomposing triethylaluminum ($C_6H_{15}Al$) in the presence of the core. The $C_6H_{15}Al$ and the core may, for example, be delivered into a suspensionized bed operated under conditions (e.g., temperature, pressure, suspensionization velocity, etc.) sufficient to form an Al-containing shell on the core. In additional embodiments, a shell comprising an organic material may be formed on a core comprising a more reactive metal material (e.g., at least one of Mg, Al, Ca, Mn, Zn, thereof, a combination thereof, etc.), a more reactive anhydrous metal salt (e.g., $AlBr_3$, $MgCl_2$, $FeCl_3$, $AlCl_3$), or another more reactive material by exposing the core to a plurality of precursor compounds so that exposed atoms of the core chemically bond with at least a portion of the precursor compounds. The precursor compounds react with and/or spontaneously absorb to the core, and the formation of the organic material may terminate when exposed atoms of the core are no longer available (e.g., unreacted with a precursor compound, or accessible for reaction with a precursor compound). Accordingly, the organic material may be self-assembled and self-limiting. For example, a self-assembled and self-limiting shell comprising a monolayer of an organosilane material may be formed on a core comprising an Mg—Al alloy by exposing the core to precursor compounds comprising at least one of chlorosilanes and alkoxysilanes. As another example, a self-assembled and self-limiting shell comprising a monolayer of organic material may be formed by exposing a core (e.g., a surface-treated core comprising an Mg—Al alloy) to precursor compounds comprising at least one of functional thiophenes, and functional thiols. In additional embodiments, the formation of the shell may not be self-limiting, and may continue even if there is no longer at least one exposed portion of the core.

At least some of the reactive particles may be functionalized to limit and/or enhance interactions between the reactive particles and different materials present within a hydrocarbon-bearing subterranean formation. For example, the reactive particles may be configured to exhibit an affinity for at least one material provided to and/or already present within the subterranean formation. Such an affinity may assist with the dispersion of the reactive particles within a carrier fluid (e.g., an aqueous material, an organic material, etc.) of the suspension, may at least temporarily protect the reactive particle from at least one of material provided to and/or already present within the subterranean formation, may assist in the removal of a hydrocarbon material from surfaces of the subterranean formation, and/or may assist in the stabilization of mixtures (e.g., emulsions, such as hydrocarbon material dispersed in aqueous material emulsions, or aqueous material dispersed in hydrocarbon material emulsions) formed within the subterranean formation. The reactive particles may be structured and formulated (e.g., through one or more functional groups) to be at least partially hydrophilic, hydrophobic, amphiphilic, oxophilic, lipophilic, and/or oleophilic. As a non-limiting example, hydrophilic functional groups may enable the particles to more readily stabilize oil-water and/or oil-brine emulsions in which the continuous phase is water or brine, whereas hydrophobic functional groups shell may enable the reactive particles too more readily stabilize oil-water and/or oil-brine emulsions in which the continuous phase is oil. In some embodiments, the reactive particles are structured and formulated to exhibit an affinity for both an internal surface of the subterranean formation and a hydrocarbon material present within the subterranean formation. Such an affinity may, for example, enable the reactive particles to gather (e.g., agglomerate) at an interface between the internal surface of the subterranean formation and the hydrocarbon material to assist with removing the hydrocarbon material from the internal surface of the subterranean formation. Any portions (e.g., cores, shells, etc.) of the reactive particles may be functionalized to exhibit desired affinities and/or aversions for different materials.

Non-limiting examples of suitable functional groups for modifying the affinities and/or aversions of the reactive particles for different materials include carboxy groups; epoxy groups; ether groups; ketone groups; amine groups; hydroxy groups; alkoxy groups; alkyl groups, such as methyl, ethyl, propyl, butyl, pentyl, hexyl, octyl, dodecyl, and/or octadecyl groups; aryl groups, such as phenyl, and/or hydroxyphenyl groups; aralkyl groups; alkaryl groups, such as benzyl groups attached via the aryl portion (e.g., 4-methylphenyl, 4-hydroxymethylphenyl, or 4-(2-hydroxyethyl) phenyl, and/or aralkyl groups attached at the benzylic (alkyl) position, such as in a phenylmethyl and 4-hydroxyphenylmethyl groups, and/or attached at the 2-position, such as in a phenethyl and 4-hydroxyphenethyl groups); lactone groups; imidazole and pyridine groups; fluorinated groups; functionalized polymeric groups, such as acrylic chains having carboxylic acid groups, hydroxyl groups, and/or amine groups; functionalized oligomeric groups; and/or combinations thereof. The functional groups may be attached to the reactive particles directly, and/or through intermediate functional groups (e.g., carboxy groups, amino groups, etc.) by way of one or more conventional reaction mechanisms (e.g., amination, nucleophilic substitution, oxidation, Stille coupling, Suzuki coupling, diazo coupling, organometallic coupling, etc.).

In some embodiments, surfaces (e.g., aluminum-containing surfaces, such as aluminum-containing shell surfaces) of at least some of the reactive particles are oxidized and functionalized with aryl groups. Such reactive particles may, for example, exhibit affinity to surfaces of a subterranean formation and to an asphaltene material contained within interstitial spaces (e.g., pores, cracks, fractures, channels, etc.) of the subterranean formation. In additional embodiments, surfaces of at least some reactive particles are oxidized and functionalized with alkyl groups. Such reactive particles may, for example, exhibit affinity to surfaces of a subterranean formation and to a paraffin material contained within interstitial spaces of the subterranean formation. In further embodiments, at least some of the reactive particles are formulated to exhibit desired affinities and/or aversions for different materials without having to perform additional processing acts to attach functional groups thereto. For example, one or more portions (e.g., cores, etc.) of at least some of the reactive particles may already exhibit desired affinities and/or aversions for different materials without having to perform additional functionalization acts.

Each of the reactive particles may have substantially the same surface modification (e.g., shell, surface functionalization, combination thereof, etc.), the surface modification of at least one of the reactive particles may be different than the surface modification of at least one other of the reactive particles, or at least one of the reactive particles may have substantially no surface modification. In some embodiments, each of the reactive particles has substantially the same surface modification. In additional embodiments, a portion of the reactive particles have substantially the same surface modification, and another portion of the reactive particles have a different surface modification. In further embodiments, a portion of the reactive particles have at least one type of surface modification, and another portion of the reactive particles are substantially free of surface modifications. In yet further embodiments, each of the reactive particles is substantially free of surface modifications.

The size and shape of each of the reactive particles may be selected based on the characteristics of the hydrocarbon-bearing subterranean formation. For example, the reactive particles may be sized and shaped to fit within interstitial spaces (e.g., pores, cracks, fractures, channels, etc.) of the subterranean formation. In addition, the reactive particles may be sized and shaped based on one or more properties (e.g., molecular weight, density, viscosity, etc.) of a hydrocarbon material contained within the interstitial spaces of the subterranean formation. Relatively smaller particles may, for example, be selected for hydrocarbon materials (e.g., shale, tar sands) including relatively higher molecular weight hydrocarbons (e.g., asphaltenes, various paraffins, etc.) to promote the conversion (i.e., through one or more reactions) of the higher molecular weight hydrocarbons into relatively lower molecular weight hydrocarbons, as described in further detail below. Relatively smaller particles may also increase the stability of an emulsion including an aqueous material (e.g., water, brine, etc.) and hydrocarbons from the subterranean formation. In some embodiments, the reactive particles may comprise reactive nanoparticles. As used herein the term "nanoparticle" means and includes a particle having an average particle width or diameter of less than about 1 micrometer (μm) (i.e., 1000 nanometers). Each of the reactive particles may, for example, independently have an average particle width or diameter of less than or equal to about 500 nanometers (nm), such as less than or equal to about 100 nm, less than or equal to about 50 nm, less than or equal to about 10 nm, or less than or equal to about 1 nm. In additional embodiments, one or more of the reactive particles may have an average particle width or diameter greater than or equal to about 1 μm, such as within a range of from about 1 μm to about 25 μm, from about 1 μm to about 20 μm, or from about 1 μm to about 10 μm. Furthermore, each of the reactive particles may independently be of a desired shape, such as at least one of a spherical shape, a hexahedral shape, an ellipsoidal shape, a cylindrical shape, a platelet shape, a conical shape, or an irregular shape. In some embodiments, each of the reactive particles has a substantially spherical shape.

The reactive particles may be monodisperse, wherein each of the reactive particles has substantially the same size, shape, and material composition, or may be polydisperse, wherein the reactive particles include a range of sizes, shapes, and/or material compositions. In some embodiments, each of the reactive particles comprises an Mg—Al alloy nanoparticle having substantially the same size and the same shape as each other of the reactive particles. In additional embodiments, each of the reactive particles comprises an Mg—Al alloy core covered with a shell comprising substantially the same material (e.g., substantially the same metal material, substantially the same organic material, etc.), and having substantially the same size and the same shape as each other of the reactive particles. In further embodiments, each of the reactive particles comprises an anhydrous $AlCl_3$ core covered with a shell comprising substantially the same material (e.g., substantially the same metal material, such as substantially the same Al-containing material), and having substantially the same size and the same shape as each other of the reactive particles. In yet further embodiments, at least one of the reactive particles comprises a different size, a different shape, and/or a different material composition than at least one other of the reactive particles.

The concentration of the reactive particles in the suspension may be tailored to the amount and material composition of the hydrocarbon material contained within the subterranean formation. The suspension may include a sufficient amount of the reactive particles to facilitate the removal of the hydrocarbon material from surfaces of the subterranean formation. In addition, the suspension may include a sufficient amount of the reactive particles to facilitate at least one of the formation of a stable hydrocarbon-water emulsion (e.g., a stable picking emulsion), and the conversion of at least a portion of the hydrocarbons of the hydrocarbon material into higher quality hydrocarbons, as described in further detail below. By way of non-limiting example, the suspension may comprise from about 0.001 percent by weight (wt %) to about 50 wt % reactive particles, such as from about 0.01 wt % to about 25 wt % reactive particles, from about 0.01 wt % to about 10 wt % reactive particles, from about 0.01 wt % to about 5 wt % reactive particles, or from about 0.01 wt % to about 1 wt % reactive particles.

The carrier fluid of the suspension may comprise any flowable material (e.g., gaseous material, liquid material, combination thereof, etc.) that is compatible with the reactive particles of the suspension. The carrier fluid may, for example, comprise at least one of an aqueous material, and an organic material. Non-limiting examples of suitable aqueous materials include fresh water, seawater, produced water, steam, brines (e.g., mixtures of water and at least one salt, such as water and at least one of ammonium chloride, calcium chloride, calcium bromide, magnesium chloride, magnesium boride, potassium chloride, potassium formate, sodium chloride, sodium boride, sodium formate, zinc bromide, zinc formate, and zinc oxide), aqueous-based foams, water-alcohol mixtures, or combinations thereof. Non-limiting examples of suitable organic materials include oils and non-polar liquids useful for downhole applications, such as crude oil, diesel, mineral oil, esters, refinery cuts and blends, alpha-olefins, and synthetic-based materials including surfactants, emulsifiers, corrosion inhibitors and other chemicals commonly used in downhole applications (e.g., ethylene-olefin oligomers, fatty acid esters, fatty alcohol esters, ethers, polyethers, paraffinic hydrocarbons, aromatic hydrocarbons, alkyl benzenes, terpenes, etc.). The carrier fluid may be selected based on one or more properties of the reactive particles. For example, the carrier fluid may be selected to delay, limit, or even prevent substantial chemical degradation of the reactive particles until after the reactive particles are delivered into the subterranean formation. In some embodiments, exposed portions of the reactive particles comprise a water-reactive material (e.g., a material formed of and including at least one of Mg, Al, Ca, Mn, Zn, an alloy thereof, a combination thereof, etc.) and the carrier fluid comprises an organic material. In additional embodiments, exposed portions of the reactive particles comprise a water-reactive material (e.g., a metal material formed of and including at least one of Mg, Al, Ca, Mn, Zn, an alloy thereof, a combination thereof; an anhydrous metal salt, such as $AlBr_3$, $MgCl_2$, $FeCl_3$, $AlCl_3$; etc.) and the carrier fluid comprises an aqueous material. In further embodiments, exposed portions of the reactive particles comprise a water-reactive material (e.g., an organic material) that is less reactive than another portion (e.g., an internal portion) of the reactive particles, and the carrier fluid comprises at least one of an aqueous material and an organic material.

In addition, the suspension may, optionally, include at least one additive. By way of non-limiting example, the additive may be at least one of a surfactant, an emulsifier, a corrosion inhibitor, a catalyst, a dispersant, a viscosifying agent, a scale inhibitor, a scale dissolver, a defoamer, a biocide, and/or a different additive conventionally utilized in the well service industry. The type and amount of the additive may at least partially depend on the properties of the reactive particles, on the properties of the subterranean formation, and on the properties of the hydrocarbon material contained within the subterranean formation. The suspension may be substantially homogeneous (e.g., the reactive particles and the additive, if present, may be uniformly dispersed throughout the suspension), or may be heterogeneous (e.g., the reactive particles and the additive, if present, may be non-uniformly dispersed throughout the suspension).

In some embodiments, the additive comprises at least one surfactant. The surfactant may, for example, be a material configured to enhance the stability of an emulsion of an aqueous material and a hydrocarbon material. The surfactant may serve as a barrier to the coalescence of adjacent units (e.g., droplets, discrete agglomerations, etc.) of the hydrocarbon material before, during, and after the extraction of the hydrocarbon material from a subterranean formation containing the hydrocarbon material. The surfactant may be any anionic, non-ionic, zwitterionic, or amphiphilic surfactant compatible with the hydrocarbon material and with the other components (e.g., the reactive particles, the carrier fluid, etc.) of the suspension. Non-limiting examples of suitable surfactants include fatty acids having a carbon chain length of up to about 22 carbon atoms, such as stearic acids, and esters thereof; poly(alkylene glycols), such as poly(ethylene oxide), poly(propylene oxide), and block and random poly(ethylene oxide-propylene oxide) copolymers; and polysiloxanes, such as silicone polyethers having both a hydrophilic part (low-molecular-weight polymer of ethylene oxide or propylene oxide or both) and a hydrophobic part (the methylated siloxane moiety).

In further embodiments, the additive comprises at least one catalyst. The catalyst may, for example, comprise a plurality of catalyst particles. The catalyst particles may be structured and formulated to facilitate, mediate, and/or enhance one or more reactions with the reactive particles. For example, the catalyst particles may accelerate reaction rates between the reactive particles and at least one of the carrier fluid of the suspension, the hydrocarbon material contained within the subterranean formation, and another material (e.g., an aqueous material, such as fresh water, seawater, produced water, brines, aqueous-based foams, and water-alcohol mixtures) delivered to and/or already present within the subterranean formation. As a non-limiting example, if the reactive particles are formed of and include a reactive metal material (e.g., at least one of Mg, Al, Ca, Mn, Zn, an alloy thereof, a combination thereof, etc.), the catalyst particles may accelerate electrochemical reactions between at least a portion of the reactive particles and an aqueous material (e.g., an aqueous carrier fluid of the suspension, a different aqueous material delivered to and/or already present within the subterranean formation, etc.) to produce heat and a desired reaction product (e.g., $H_2$). The catalyst particles may be relatively cathodic in the presence of the aqueous material, whereas the reactive particles may be relative anodic in the presence of the aqueous material. The catalyst particles may thus promote (e.g., enhance) electrochemical degradation of the reactive particles in the presence of an electrolyte. The catalyst particles may be more resistant to chemical degradation (e.g., corrosion) under the environment conditions (e.g., temperatures, pressures, material compositions, etc.) present within the subterranean formation than the reactive particles. As a non-limiting example, if the reactive particles are formed of and include a reactive metal material (e.g., a material comprising at least one of Mg, Al, Ca, Mn, Zn, an alloy thereof, a combination thereof, etc.), the catalyst particles may be formed of and include a relatively less reactive metal material such as various grades of steels, tungsten (W), chromium (Cr), Ni, Cu, Co, Fe, alloys thereof, or combinations thereof. The size and the shape of each of the catalyst particles may be substantially the same as the size and the shape of each of the reactive particles, or at least one of the size and the shape of at least one of the catalyst particles may be different than at least one of the size and the shape of at least one of the reactive particles. In some embodiments, the catalyst particles comprise nanoparticles formed of and including at least one of W, Cr, Ni, Cu, Co, and Fe. A concentration of the catalyst particles may be sufficiently low so as to have minimal, if any, effect on the stability of an emulsion formed using the suspension, as described in further detail below.

With continued reference to FIG. 1, the flooding process 102 includes providing the flooding suspension into a hydrocarbon-bearing subterranean formation. The flooding suspension may be provided into the subterranean formation through conventional processes, which are not described in detail herein. For example, a pressurized stream of the flooding suspension may be pumped into injection well extending to a desired depth in the subterranean formation, and may infiltrate (e.g., permeate, diffuse, etc.) into interstitial spaces of the subterranean formation. The extent to which the flooding suspension infiltrates into the interstitial spaces of the subterranean formation at least partially depends the properties of the flooding suspension (e.g., density, viscosity, particle size, temperature, pressure, etc.), the subterranean formation (e.g., porosity, pore size, material composition, etc.), and the hydrocarbon materials (e.g., molecular weight, density, viscosity, etc.) contained within the interstitial spaces of the subterranean formation. An injection temperature of the flooding suspension may be sufficiently low as to substantially limit or even prevent a premature reaction between the degradable particles and another material (e.g., an aqueous material, such as water, brine, etc.) being delivered into and/or already present within the subterranean formation. In some embodiments, the flooding suspension is delivered into the subterranean formation at a temperature less than or equal to an ambient downhole temperature of the subterranean formation. By way of non-limiting example, the flooding suspension may be delivered into the subterranean formation at a temperature less than or equal to about 50° C., such as less than or equal to about 40° C., or less than or equal to about 35° C.

During the injection process 102, at least some of the reactive particles of the suspension may abrasively remove at least a portion of the hydrocarbon material contained within the subterranean formation from internal surfaces (e.g., pore surfaces, crack surfaces, fracture surfaces, channel surfaces, etc.) of the subterranean formation. In addition, at least some of the reactive particles may aggregate in a confined rock-oil-brine three-phase contact region of the subterranean formation to provide a disjoining pressure and detach at least a portion of the hydrocarbon material contained within the subterranean formation from the internal surfaces of the subterranean formation. Furthermore, at least some of the reactive particles may gather (e.g., agglomerate) at, adhere to, and/or adsorb to interfaces of the internal surfaces of subterranean formation, the hydrocarbon material contained within the subterranean formation, an aqueous material (e.g., water, brine) contained within the subterranean formation, and the carrier fluid of the suspension to form a stabilized emulsion (e.g., a Pickering emulsion) that substantially resists coalescence of dispersed (e.g., hydrocarbon) and continuous (e.g., water, brine, etc.) phases.

Next, during the reaction process 104, at least a portion of the reactive particles of the stabilized emulsion within the subterranean formation may be at least partially reacted with at least one other material. One or more properties (e.g., temperature, pH, material composition, pressure, etc.) of the stabilized emulsion within the subterranean formation may be modified (e.g., altered, changed) to at least partially react the reactive particles thereof with at least one other material, or the properties of the stabilized emulsion within the subterranean formation may be retained (e.g., maintained, sustained, preserved, etc.) to at least partially react the reactive particles with at least one other material. In some embodiments, at least some of the reactive particles are reacted over time without directly modifying one or more properties (e.g., temperature, pH, material composition, pressure, etc.) of the stabilized emulsion within the subterranean formation. For example, at least some of the reactive particles may be reacted over time without heating, decreasing the pH, adding materials to, and/or modifying the pressure of the stabilized emulsion within the subterranean formation. In additional embodiments, at least one environmental condition (e.g., temperature, pH, material exposure, pressure, etc.) to which the reactive particles of the stabilized emulsion are exposed within the subterranean formation may be modified to adjust (e.g., increase, decrease) to at least partially react the reactive particles with at least one other material. Such reactions may assist in the extraction of hydrocarbons from the subterranean formation, and/or may increase the quality of the hydrocarbons extracted from the subterranean formation, as described in further detail below.

As a non-limiting example, the temperature of the stabilized emulsion within the subterranean formation may be modified to facilitate and/or enhance reactions between the reactive particles and at least one aqueous material (e.g., water, steam, brine, etc.) already present in and/or delivered to the stabilized emulsion. In some embodiments, the temperature of the stabilized emulsion is modified by exposing the stabilized emulsion to a material exhibiting increased temperature relative to the stabilized emulsion. For example, at least one of a liquid material (e.g., an aqueous material, such as at least one of water, brine, and aqueous acid; an organic material, such as at least one of diesel, mineral oil; a combination thereof; etc.) and a gaseous material (e.g., steam, air, a gaseous hydrocarbon material, nitrogen, carbon dioxide, combinations thereof, etc.) exhibiting a higher temperature than that of the stabilized emulsion may be provided into the subterranean formation to interact with and increase the temperature of the reactive particles. In some embodiments, the stabilized emulsion is exposed to at least one material exhibiting a temperature of greater than or equal to about 25° C., such as greater than or equal to about 35° C., greater than or equal to about 50° C., greater than or equal to about 75° C., greater than or equal to about 100° C., or greater than or equal to about 200° C. In additional embodiments, the ambient downhole temperature of the subterranean formation is used to increase the temperature of the reactive particles. For example, if the ambient downhole temperature of the subterranean formation is greater than that of the stabilized emulsion, then the ambient downhole temperature may be employed to increase the temperature of the reactive particles over time. If the reactive particles are less than completely encapsulated (e.g., covered) with less reactive shells and/or non-reactive shells (e.g., where less reactive shells and/or non-reactive shells are substantially absent from the reactive particles, where the reactive particles comprise reactive cores partially encapsulated with less reactive shells and/or non-reactive shells, etc.), an increase in the temperature of the reactive particles may increase the rate at which at least one aqueous material (e.g., water, brine, etc.) present within and/or delivered to the subterranean formation reacts with or otherwise degrades (e.g., corrodes) the reactive particles. Conversely, if the reactive particles comprise reactive cores substantially covered with less reactive shells and/or non-reactive shells, an increase in the temperature of the reactive particles may facilitate thermal expansion of the reactive cores to damage (e.g., crack, break open, etc.) the less reactive shells and/or non-reactive shells, expose the reactive cores to at least one aqueous material (e.g., water, brine, etc.) present within and/or delivered to the subterranean formation, and increase the rate at which the aqueous material reacts with or otherwise degrades the reactive cores.

As another non-limiting example, the pH of the stabilized emulsion within the subterranean formation may be modified to facilitate and/or enhance a reaction between the reactive particles and at least one aqueous material (e.g., water, steam, brine, etc.) already present in and/or delivered to the stabilized emulsion. In some embodiments, the pH of the stabilized emulsion is modified by exposing (e.g., contacting) the stabilized emulsion to a material having a pH less than that of the stabilized emulsion. For example, at least one of hydrochloric acid (HCl), hydrobromic acid (HB), nitric acid ($HNO_3$), sulfuric acid ($H_2SO_4$), phosphoric acid ($H_3PO_4$), formic acid ($CH_2O_2$), and acetic acid ($C_2H_4O_2$) may be added to the stabilized emulsion. In some embodiments, at least one of aqueous HCl and aqueous $H_2SO_4$ is added to the stabilized emulsion. If the reactive particles are less than completely encapsulated (e.g., covered) with less reactive and/or non-reactive shells, a decrease in the pH of the stabilized emulsion may increase the rate at which the reactive particles are degraded (e.g., corroded). If the reactive particles comprise reactive cores substantially covered with less reactive shells, a decrease in the pH of the stabilized emulsion may increase the rate at which the less reactive shells are degraded to more rapidly expose the reactive cores, and may also increase the rate at which the reactive cores are degraded in the absence of the shells.

In some embodiments, modifying one or more properties (e.g., temperature, pH, material composition, pressure, etc.) of the stabilized emulsion within the subterranean formation to at least partially react the particles of the stabilized emulsion with another material may result in the production of $H_2$ and heat within the subterranean formation. As a non-limiting example, if at least some of the reactive particles are formed of and include Mg (e.g., an Mg alloy, such as an Mg—Al alloy), the Mg may exothermically react with water to produce $H_2$ and heat through the following reaction:

$$Mg_{(s)} + 2H_2O \rightarrow Mg(OH)_{2(aq)} + H_{2(g)} \qquad (1)$$

In turn, the produced $H_2$ and heat may increase the pressure within the subterranean formation to assist with extraction of hydrocarbons from the subterranean formation. The produced $H_2$ and heat may also facilitate the conversion of one or more hydrocarbons contained within the subterranean formation into relatively smaller, higher quality hydrocarbons. For example, the heat produced may be used to thermally crack larger hydrocarbons (e.g., hydrocarbons having boiling points greater than or equal to about 350° C.) of the hydrocarbon material into smaller hydrocarbons. Such smaller hydrocarbons may exhibit comparatively lower densities, facilitating easier extraction thereof, and increased versatility and value. Furthermore, the $H_2$ produced may also be employed in the presence of one or more catalysts to hydrogenate aromatic hydrocarbons, such as polycyclic aromatic hydrocarbons (PAHs), into saturated hydrocarbons. Such saturated hydrocarbons may exhibit comparatively lower viscosity, and increased versatility and value. In addition, at least a portion of the $H_2$ produced may, optionally, be ignited (e.g., with the addition of air) to generate higher temperatures and pressures downhole.

In additional embodiments, modifying one or more properties (e.g., temperature, pH, material composition, pressure, etc.) of the stabilized emulsion within the subterranean formation to at least partially react the particles of the stabilized emulsion with another material may result in the production of HCl and heat within the subterranean formation. As a non-limiting example, if at least some of the reactive particles are formed of and include anhydrous $AlCl_3$, the anhydrous $AlCl_3$ may exothermically react with water to rapidly produce HCl and heat through the following reaction:

$$AlCl_{3(s)} + H_2O \rightarrow AlCl_2OH_{(s)} + HCl_{(g)} \qquad (2)$$

In turn, the produced HCl and heat may assist with extraction of hydrocarbons from the subterranean formation. For example, if the reactive particles have affinity for a hydrocarbon material (e.g., an asphaltene material, a paraffin material, etc.) contained within the subterranean formation and for the surfaces of the subterranean formation, the rapid production of HCl may assist with the removal of the hydrocarbon material from the surfaces of the subterranean formation. Furthermore, depending on the material composition of the subterranean formation, the HCl produced may facilitate the chemical degradation (e.g., corrosion) of surfaces of the subterranean formation. For example, if the surfaces of the subterranean formation comprise a carbonate material, the HCl may react with the carbonate material to at least partially degrade the surfaces of the subterranean formation. At least partially degrading the surfaces of the subterranean formation may free (e.g., release) the hydrocarbon material from the surfaces. Degrading the surfaces of the subterranean formation may also increase the pore sizes of the subterranean formation to assist with the extraction of the hydrocarbon material from the subterranean formation. In addition, the heat produced may be used to reduce the viscosity of the oil.

Next, during the extraction process 106, hydrocarbons may be extracted (e.g., removed) from the subterranean formation. An additional material (e.g., water, brine, steam, etc.) stream may be used (e.g., provided into the subterranean formation via an injection well) to flow (e.g., drive, sweep, force, etc.) the hydrocarbons out of the subterranean formation. The hydrocarbons may comprise converted hydrocarbons derived (e.g., through one or more of the cracking processes previously described) from the hydrocarbon material detached (e.g., released, abraded, removed, etc.) from the surfaces of the subterranean formation, and/or may comprise unconverted hydrocarbons detached from the surfaces of the subterranean formation. The hydrocarbons may be extracted from the subterranean formation as part of a stabilized emulsion. The stabilized emulsion may comprise a Pickering emulsion, wherein particles (e.g., at least partially unreacted reactive particles; remaining sacrificial particles; particles of material from the subterranean formation, such as clay particles; etc.) gather at, adhere to, and/or adsorb to interfaces of a dispersed (e.g., hydrocarbon) phase and a continuous (e.g., aqueous) phase to prevent, by substantially limiting, coalescence of the dispersed and continuous phases. In additional embodiments, the stabilized emulsion may comprise a surfactant-stabilized emulsion, wherein a surfactant present at interfaces of a dispersed (e.g., hydrocarbon) phase and a continuous (e.g., aqueous) phase prevents, by substantially limiting, coalescence of the dispersed and continuous phases. Particles (e.g., at least partially unreacted reactive particles; catalyst particles; particles of material from the subterranean formation, such as clay particles; etc.) may also be present at the interfaces of the dispersed and continuous phases of surfactant-stabilized emulsion and may assist in stabilizing the surfactant-stabilized emulsion. One or more results of the reaction process 104 (e.g., increased pressure, increased temperature, decreased hydrocarbon viscosity, etc.) may assist in driving the stabilized emulsion out of the subterranean formation (e.g., from the subterranean formation and into a production well) during the extraction process 106.

Following extraction from the subterranean formation, the stabilized emulsion may be subjected to additional processing. For example, the stabilized emulsion may be subjected to one or more reaction, filtration, precipitation, and/or settling processes to coalesce the dispersed and continuous phases of the stabilized emulsion, and separate the hydrocarbons from the other components (e.g., water, brine, various particulate materials, etc.) included in the stabilized emulsion. The separated hydrocarbons may be utilized as desired.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of extracting hydrocarbons from a subterranean formation, comprising:

forming a suspension comprising a carrier fluid and reactive nanoparticles each comprising: a core comprising an Mg alloy comprising Mg and one or more of Al, Bi, Cd, Ca, Ce, Co, Cu, Fe, In, Li, Mn, Sc, Si, Ag, Sr, Th, Sn, Ti, W, Y, Zn, and Zr; and an alumina shell directly on and completely encapsulating the core, the core more exothermically reactive with water than the alumina shell;

introducing the suspension into a subterranean formation containing a hydrocarbon material to form an emulsion stabilized by the reactive nanoparticles and comprising a dispersed phase of the hydrocarbon material and a continuous phase of an aqueous material;

exothermically reacting at least a portion of the reactive nanoparticles with at least the aqueous material within the subterranean formation to form a treated hydrocarbon material from the hydrocarbon material; and extracting the treated hydrocarbon material from the subterranean formation.

2. The method of claim 1, wherein forming a suspension comprises:

forming the reactive nanoparticles to comprise a metal material formulated to switch from a first chemical degradation rate to a second chemical degradation rate in response to modifying at least one environmental condition within the subterranean formation; and
providing the reactive nanoparticles into at least one of an aqueous fluid and an organic fluid.

3. The method of claim 1, wherein forming a suspension comprises forming the reactive nanoparticles to have one or more functional groups selected from the group consisting of carboxy groups, ether groups, ketone groups, amine groups, hydroxy groups, alkoxy groups, alkyl groups, aryl groups, aralkyl groups; alkaryl groups, lactone groups, imidazole groups, pyridine groups, and fluorinated groups.

4. The method of claim 1, wherein introducing the suspension into a subterranean formation containing a hydrocarbon material comprises introducing the suspension into the subterranean formation at a temperature of less than or equal to about 50° C.

5. The method of claim 1, wherein introducing the suspension into a subterranean formation containing a hydrocarbon material comprises introducing the suspension into interstitial spaces of the subterranean formation containing at least one of an asphaltene material and a paraffin material.

6. The method of claim 1, wherein exothermically reacting at least a portion of the reactive nanoparticles with at least the aqueous material within the subterranean formation to form a treated hydrocarbon material from the hydrocarbon material comprises increasing the temperature of the reactive nanoparticles to exothermically react the reactive nanoparticles with the aqueous material and modify at least one of a viscosity and a material composition of the hydrocarbon material.

7. The method of claim 6, wherein increasing the temperature of the reactive nanoparticles comprises providing at least one of a liquid material and a gaseous material exhibiting a temperature greater than that of the reactive nanoparticles into the subterranean formation after introducing the suspension into the subterranean formation to increase the temperature of the reactive nanoparticles.

8. A method of extracting hydrocarbons from a subterranean formation, comprising:
selecting discrete, coated nanoparticles each comprising a core comprising an Mg alloy comprising Mg and one or more of Al, Bi, Cd, Ca, Ce, Co, Cu, Fe, In, Li, Mn, Sc, Si, Ag, Sr, Th, Sn, Ti, W, Y, Zn, and Zr, wherein the Mg alloy is exothermically reactive with water, and a shell comprising an organic material less exothermically reactive with water than the Mg alloy;
selecting a liquid from the group consisting of an oil and a non-polar organic liquid;
selecting at least one additive from the group consisting of catalyst nanoparticles, a surfactant, an emulsifier, a corrosion inhibitor, a dispersant, a scale inhibitor, a scale dissolver, a defoamer, and a biocide;
combining the discrete, coated nanoparticles with the liquid and the at least one additive to form a suspension consisting essentially of the discrete, coated nanoparticles, the liquid, and the at least one additive;
injecting the suspension into a subterranean formation having a hydrocarbon material attached to internal surfaces thereof;
modifying at least one of a temperature, pH, material composition, and pressure within the subterranean formation to react at least a portion of the discrete, coated nanoparticles with an aqueous material and form a stabilized emulsion comprising a treated hydrocarbon material; and
extracting the stabilized emulsion from the subterranean formation.

9. The method of claim 8, wherein selecting discrete, coated nanoparticles comprises selecting at least some of the discrete, coated nanoparticles to further comprise at least one element that accelerates degradation of the metal alloy of the core in the aqueous material, the at least one element selected from the group consisting of W, Cr, Ni, Cu, Co, and Fe.

10. The method of claim 8, wherein selecting at least one additive comprises selecting the catalyst nanoparticles, the catalyst nanoparticles each comprising at least one of W, Cr, Ni, Cu, Co, and Fe.

11. The method of claim 8, wherein selecting at least one additive comprises selecting the surfactant.

12. The method of claim 8, wherein injecting the suspension into a subterranean formation comprises pumping a pressurized stream of the suspension into the subterranean formation to abrasively remove at least a portion of the hydrocarbon material from the internal surfaces of the subterranean formation.

13. The method of claim 8, wherein modifying at least one of a temperature, pH, material composition, and pressure within the subterranean formation to react at least a portion of the reactive nanoparticles with an aqueous material to produce heat and form a stabilized emulsion comprising a treated hydrocarbon material comprises converting at least some hydrocarbons of the hydrocarbon material into smaller molecular weight hydrocarbons using the produced heat.

14. A method of treating a hydrocarbon material within a subterranean formation, comprising:
forming a suspension consisting of:
discrete functionalized nanoparticles exothermically reactive with water, each of the discrete functionalized nanoparticles comprising:
a core comprising an Mg alloy comprising Mg and one or more of Al, Bi, Cd, Ca, Ce, Co, Cu, Fe, Ga, In, Li, Mn, Ni, Sc, Si, Ag, Sr, Th, Sn, Ti, W, Y, Zn, and Zr;
a shell directly on and completely encapsulating the core and comprising aluminum oxide; and
functional groups attached to the shell and selected from the group consisting of carboxy groups, ether groups, ketone groups, amine groups, hydroxy groups, alkoxy groups, alkyl groups, aryl groups, aralkyl groups; alkaryl groups, lactone groups, imidazole groups, pyridine groups, and fluorinated groups; and
a liquid selected from the group consisting of fresh water, seawater, produced water, a brine, an aqueous-based foam, and water-alcohol mixture;
providing the suspension into interstitial spaces of a subterranean formation containing a hydrocarbon material to form an emulsion stabilized by the discrete functionalized nanoparticles; and
reacting at least a portion of the discrete functionalized nanoparticles of the stabilized emulsion within the subterranean formation to produce heat and modify at least one property of the hydrocarbon material.

15. The method of claim 14, wherein reacting at least a portion of the discrete functionalized nanoparticles within the subterranean formation comprises reacting the discrete functionalized nanoparticles with an aqueous material to produce heat and $H_2$.

16. The method of claim 1, wherein forming a suspension comprises forming the suspension to consist essentially of an organic liquid and the reactive nanoparticles.

17. The method of claim 14, wherein the Mg alloy of the core of each of the discrete functionalized nanoparticles is selected from the group consisting of an Mg—Zn alloy, an Mg—Al alloy, an Mg—Mn alloy, an Mg—Li alloy, and an Mg—Ca alloy.

18. The method of claim 14, wherein the Mg alloy of the core of each of the discrete functionalized nanoparticles is an Mg Al alloy.

19. The method of claim 14, wherein the Mg alloy of the core of each of the discrete functionalized nanoparticles is an Mg—Al—X alloy comprising up to about 85% Mg, up to about 15% Al, and up to about 5% X, wherein X comprises one or more of Bi, Cd, Ca, Co, Cu, Fe, Ga, In, Li, Mn, Ni, Sc, Si, Ag, Sr, Th, Sn, Ti, Y, Zn, and Zr.

* * * * *

UNITED STATES PATENT AND TRADEMARK OFFICE
CERTIFICATE OF CORRECTION

PATENT NO. : 10,060,237 B2
APPLICATION NO. : 14/088339
DATED : August 28, 2018
INVENTOR(S) : Oleg A. Mazyar et al.

Page 1 of 1

It is certified that error appears in the above-identified patent and that said Letters Patent is hereby corrected as shown below:

In the Specification

| | | |
|---|---|---|
| Column 2, | Lines 33-36, | change "Methods of extracting hydrocarbons from a subterranean formation are described, as are methods of extracting hydrocarbons from a subterranean formation are described, as are methods of treating" to --Methods of extracting hydrocarbons from a subterranean formation are described, as are methods of treating-- |
| Column 6, | Line 33, | change "AJ62, AJ50x, AH51x, AJ52x," to --AJ62, AJ50x, AJ51x, AJ52x,-- |
| Column 6, | Line 46, | change "Th, Sn, W, Y," to --Th, Sn, Ti, W, Y,-- |
| Column 6, | Line 49, | change "an Al in alloy," to --an Al In alloy,-- |
| Column 6, | Line 56, | change "5Ga-5Bi-5Cu), an" to --5Ga-5Bi-5Su), an-- |
| Column 7, | Line 13, | change "one of Al, lei, Cd," to --one of Al, Bi, Cd,-- |
| Column 9, | Line 59, | change "enable the particles" to --enable the reactive particles-- |
| Column 10, | Line 52, | change "(e.g., cores, etc.)" to --(e.g., shells, cores, etc.)-- |

Signed and Sealed this
Thirteenth Day of November, 2018

Andrei Iancu
*Director of the United States Patent and Trademark Office*